(12) United States Patent
Yen

(10) Patent No.: US 9,159,978 B2
(45) Date of Patent: Oct. 13, 2015

(54) BATTERY SEPARATOR AND METHOD OF FORMING SAME

(75) Inventor: William Winchin Yen, Acton, MA (US)

(73) Assignee: APOROUS, INC., Tyngsboro, MA (US)

( * ) Notice: Subject to any disclaimer, the term of this patent is extended or adjusted under 35 U.S.C. 154(b) by 196 days.

(21) Appl. No.: 13/261,411

(22) PCT Filed: Feb. 24, 2012

(86) PCT No.: PCT/US2012/000107
§ 371 (c)(1),
(2), (4) Date: Aug. 27, 2012

(87) PCT Pub. No.: WO2012/138398
PCT Pub. Date: Oct. 11, 2012

(65) Prior Publication Data
US 2013/0029126 A1     Jan. 31, 2013

Related U.S. Application Data

(60) Provisional application No. 61/516,497, filed on Apr. 4, 2011.

(51) Int. Cl.
    *B29C 55/14*        (2006.01)
    *H01M 2/14*        (2006.01)
    *H01M 2/16*        (2006.01)

(52) U.S. Cl.
    CPC ............ *H01M 2/145* (2013.01); *H01M 2/1653* (2013.01); *Y10T 428/249921* (2015.04)

(58) Field of Classification Search
    CPC ...... B29C 55/14; B29C 55/16; B29C 55/026; H01M 2/145
    USPC .................................. 264/298, 48, 49, 171.1
    See application file for complete search history.

(56) References Cited

U.S. PATENT DOCUMENTS

| 3,351,495 A | 11/1967 | Larsen et al. |
| 3,426,754 A | 2/1969 | Bierenbaum et al. |

(Continued)

FOREIGN PATENT DOCUMENTS

| CN | 1972986 A | 5/2007 |
| CN | 101267934 A | 9/2008 |

(Continued)

OTHER PUBLICATIONS

First Office Action dated May 6, 2015, in Chinese Application No. 2012800169589, which is the Chinese counterpart to the present application.

*Primary Examiner* — Timothy Kennedy
(74) *Attorney, Agent, or Firm* — Kriegsman & Kriegsman

(57) ABSTRACT

The present invention is directed to a sheet product and to a method of forming the sheet product suitable for use as a battery separator. The method comprises forming a mixture of a thermoplastic polymer and fluid having a high vapor pressure, shaping the mixture into a sheet material and subjecting the sheet material to stretching/fluid vaporization at high temperature to form an intermediate material having a ratio of percent fluid to percent polymer crystallinity of between 0.15 and 1 followed by a second stretching/fluid vaporization at a lower temperature while removing a portion of the remainder of the fluid from the sheet. The resultant sheet is annealed and remainder of fluid removed to form a sheet product having a thickness comprising a stratified structure of small and larger pore layered configuration across its thickness.

23 Claims, 7 Drawing Sheets

(56) References Cited

U.S. PATENT DOCUMENTS

| | | |
|---|---|---|
| 3,558,764 A | 1/1971 | Isaacson et al. |
| 3,679,538 A | 7/1972 | Druin et al. |
| 3,679,540 A | 7/1972 | Zimmerman et al. |
| 3,801,404 A | 4/1974 | Druin et al. |
| 3,843,761 A | 10/1974 | Bierenbaum et al. |
| 4,138,459 A | 2/1979 | Brazinsky et al. |
| 4,247,498 A | 1/1981 | Castro |
| 4,287,276 A | 9/1981 | Lundquist, Jr. et al. |
| 4,346,142 A | 8/1982 | Lazear |
| 4,539,256 A | 9/1985 | Shipman |
| 4,650,730 A | 3/1987 | Lundquist et al. |
| 4,948,544 A | 8/1990 | Van Unen et al. |
| 4,994,335 A | 2/1991 | Kamaei et al. |
| 5,051,183 A | 9/1991 | Takita et al. |
| 5,240,655 A | 8/1993 | Troffkin et al. |
| 5,281,491 A | 1/1994 | Rein et al. |
| 5,328,760 A | 7/1994 | Gillberg-LaForce |
| 5,503,791 A | 4/1996 | Fortuin et al. |
| 5,641,565 A | 6/1997 | Sogo |
| 5,830,554 A | 11/1998 | Kaimai et al. |
| 7,479,243 B2 | 1/2009 | Funaoka et al. |
| 7,815,825 B2 | 10/2010 | Funaoka et al. |
| 7,867,649 B2 | 1/2011 | Yamaguchi et al. |
| 7,892,672 B2 | 2/2011 | Nishikawa |
| 2006/0051648 A1 | 3/2006 | Fujibayashi et al. |
| 2007/0178324 A1 | 8/2007 | Masufa et al. |
| 2009/0081543 A1 | 3/2009 | Takita et al. |
| 2009/0181295 A1 | 7/2009 | Usami et al. |
| 2009/0233145 A1 | 9/2009 | Takami et al. |
| 2011/0143185 A1 | 6/2011 | Nishikawa |

FOREIGN PATENT DOCUMENTS

| | | |
|---|---|---|
| CN | 101356216 A | 1/2009 |
| CN | 101386686 A | 3/2009 |
| EP | 2036699 A1 | 3/2009 |
| WO | 2007117042 A1 | 10/2007 |
| WO | 2009044227 A1 | 4/2009 |

Example 1
Surface of Battery sheet Product formed with high MFI

Example 3
Sheet Product of the Present Invention showing Surface Layer (left) with Small pore Structure and Oblique View of Thickness Commercial Separator Showing Substantially Uniform Porous Structure Across The Thickness (For Comparison)

BATTERY SEPARATOR AND METHOD OF FORMING SAME

CROSS-REFERENCE TO RELATED APPLICATIONS

This application is a 371 of PCT/US12/00107, filed Feb. 24, 2012, which claims the benefit of U.S. Provisional patent application No. 61/516,497, filed Apr. 4, 2011.

BACKGROUND OF THE INVENTION

The subject invention is directed to sheet products having unique configuration, their use as separators in batteries and to an improved method of forming said sheet product.

Storage batteries have at least one pair of electrodes of opposite polarity and, generally, have a series of adjacent electrodes of alternating polarity. The current flow between the electrodes is maintained by an electrolyte which can be acidic, alkaline or substantially neutral depending on the nature of the battery system. Separators are located in the batteries between adjacent electrodes of opposite polarity to prevent direct contact between the oppositely charged electrode plates. It is highly desired to have the separator (i) be thin and light weight to aid in providing a battery of high energy density; (ii) have a structure that inhibits dendrite formation between the electrode plates; (iii) have the ability to enhance the uptake and cause substantial uniform distribution of the electrolytic composition over the electrode plates (generally referred to as wicking); and (iv) provide the properties of freely permitting electrolytic conduction. It is further highly desired to be able to produce the separator sheet product in an economical and environmentally safe manner while achieving sheet product free of defects, such as pinholes and the like.

Separators conventionally used in battery systems are formed of polymeric films which, when placed in an electrolyte or electrolytic system, are capable of exhibiting a high degree of conductivity while being stable to the environment presented by the battery system. The film may be macroporous such as those formed by spun glass and the like. Alternately, the film may be microporous, such as those formed from polymeric films having fillers distributed throughout the film. The fillers aid in the adsorption of electrolyte and provide wicking properties to the sheet product. Such sheets are disclosed in U.S. Pat. Nos. 3,351,495 and 4,287,276.

Microporous sheet products have also been formed from polymeric compositions having a liquid plasticizer which, when removed by extraction methods, provide the resultant sheet with its microporous structure. Conventionally, such plasticizers are of high molecular weight oils and the like with the idea of providing compatible properties with respect to the polymeric material during the initial steps of the sheet's formation while being incompatible and readily extractable during process formation. Extraction is conventionally done by washing the plasticizer from the cooled initially formed sheet using a compatible, low molecular weight second liquid. The voids resulting from the removal of the plasticizer provide substantially uniform porosity throughout the resultant separator sheet product. The resultant mixed liquid is a waste by-product of the described process.

A still further mode of forming microporous sheet product is by stretching and annealing polyolefin sheet material to cause microporosity in the treated sheet. Such processes are disclosed in U.S. Pat. Nos. 3,426,754; 3,558,764; 3,679,538; 3,679,540; 3,801,404; 3,843,761; 4,138,459; 4,994,335; and 5,328,760. For example, a stretched microporous polypropylene is described in U.S. Pat. No. 3,679,540. The polymer is extruded under low melt temperatures with high shear stress in order to maximize polymer molecular alignment within the extruded film. The film is then annealed to consolidate the crystalline polymer network followed by stretching at low temperatures to cause tearing to occur in the crystalline regions from remaining amorphous regions. Micro-cracks are thus formed. The film is further stretched and annealed in sequential manner to cause the cracks to form into pores. The porosity of the resultant film is limited to less than about 40% and is not well controlled.

U.S. Pat. No. 4,247,498 discloses a process for forming a microporous polymeric sheet product by blending a mixture of a polymer and a compatible liquid into a homogenous mixture. The mixture is cooled under non-equilibrium conditions to initiate liquid-liquid phase separation causing droplets of the liquid to form which are each surrounded by liquid polymer. Further cooling is required to cause the polymer to solidify and then the liquid is extracted using a second liquid to produce a structure having a series of enclosed cells of substantially spherical shape which are interconnected to adjacent spherical cells. This process must be conducted in a time consuming manner and requires extraction of the initially compatible liquid by other liquids which generates a waste by-product stream of the combined liquids.

U.S. Pat. No. 4,539,256 is also directed to the formation of sheet product suitable as a microporous battery separator. The reference discloses the use of liquids having solubility and hydrogen bonding parameters which are within a few units of the respective values of the crystallizable polymer. High molecular weight mineral oil, higher ester phthalates and the like are taught to be suitable for forming initial mixtures with polyolefins. The liquid used in the initially formed polymeric sheet product must then be removed by extraction. The reference teaches that hexane or alcohols are suitable for extraction of the above described liquids. The resultant extraction mixture is a waste product that requires special handling. The resultant sheet product is described as having randomly dispersed spaces and thermoplastic plastic particles connected to each other by a plurality of polymeric fibrils. The fiber/particle arrangement causes the resultant porous product to exhibit poor tensile and puncture strengths.

U.S. Pat. No. 4,948,544 discloses a method of forming a film product by initially forming a film from a solution of a polyolefin and a first solvent such as hydrocarbon or decalin; bringing one surface of the film into contact with a second solvent; passing the film through a cooling bath containing a cooling agent selected from gas, water or hydrocarbon liquids; removing the solvents from the film at a temperature below the dissolution temperature; and stretching the film in one or more directions in the plane of the film. The final article is substantially non-pores and formed in a manner that produces a waste stream composed of a mixture of solvents.

U.S. Pat. No. 5,051,183 discloses the formation of a porous article with ultrahigh molecular weight polyethylene. The rate of cooling is taught to have an effect on the degree of crystallization.

U.S. Pat. No. 5,503,791 discloses a method of causing phase-separation within a film by contacting both sides of the film with a second solvent before the film is contacted with a cooling agent (e.g. water). The reference teaches that the density of the second solvent must be smaller than that of the cooling agent.

U.S. Pat. No. 5,830,554 disclosed a process for manufacturing a microporous polyolefin film which can be used for various battery separators. The process incorporates a polyolefin polymer (Component I) with a first diluent (Component II) and a second diluent (Component III) to form a thermodynamic single phase which can undergo thermodynamic liquid-liquid phase separation. The article is then subjected to extraction with methylene chloride to produce porosity followed by rapid cooling with cold air or cold water. The resultant mixture of liquids produces a hard to handle waste stream.

U.S. Pat. No. 7,479,243 discloses a method of producing a microporous polyolefin membrane comprising the steps of extruding a solution of a polyolefin and a solvent to produce a gel-like article, cooling the article by direct contact with cooling air, cooling water, other cooling media, or a cooling roll. It further disclose a method of treating the newly formed membrane while still in the gel-like form by first removing the pore-forming solvent originally within the gel-like form followed by treating the gel-like article with a hot solvent, such as liquid paraffin.

U.S. Pat. No. 7,815,825B2 disclose a method of treating the newly formed membrane while still in the gel-like article form with an organic solvent maintained at a temperature of 110 to 130° C.

WO 2007/117042 discloses a method of forming a microporous membrane composed of polyethylene having at least one percent of ultra-high molecular weight polyethylene. The membrane is formed by melt blending the polymers with a liquid polymer solvent, extruding and cooling the melt to produce a gel-like sheet. The sheet is then stretched and the stretched sheet is washed with a liquid capable of displacing the polymer solvent to form a porous membrane. The resultant porous membrane is stretched and heat set under the same temperature conditions to provide the resultant microporous membrane. The process includes known steps of stretching the initial sheet while retaining the polymer solvent in the sheet. The solvent is then removed by common extraction process using a second liquid to result in a by-product composed of a mixture of polymer solvent and extraction liquid. Finally, the liquid free sheet is further stretched to form their microporous membrane.

None of the above references directs one to the usage of the same high volatile, low molecular weight organic fluid for forming an initial mixture with a polyolefin and as the cooling media, to process the initially shaped polymer composition under certain sequential temperature and stretching process conditions while concurrently causing vaporization of the fluid to produce the unique sheet product structure, as described herein below.

The properties of sheet products useful as battery separators include not only permeability, mechanical strength, and dimensional stability, but also properties related to electrolytic solution absorption, and battery cyclability. It is highly desired to achieve a thin, light weight sheet product that has high wicking capability which provides the battery with the ability of maintaining electrolyte over the electrode surfaces and achieving high electrolytic conductivity while, when appropriate, providing high inhibition to formation and growth of dendrites between electrode elements of opposite polarity. Further, electrodes for lithium ion batteries are known to undergo expansion and contraction according to the intrusion and departure of lithium. Because separators are compressed when the electrodes expand, it is desirable that the separators have the ability to undergo such compression while exhibiting, when compressed, as little a decrease as possible in electrolytic solution retention. Further, it is desired to achieve a sheet product having the above properties in a cost effective and environmentally desired manufacturing manner as by utilizing the processing material in cyclical manners and by producing little or no waste stream.

SUMMARY OF THE INVENTION

The present invention is directed to the production of a sheet product suitable for use as an improved battery separator having high electrolyte wicking, high electrolytic conductivity, and high puncture strength to cause inhibition of dendrite growth. It has been unexpectedly found that by using certain specific starting compositions and manufacturing conditions, a unique sheet product having an alternating layered or stratified structure across the sheets thickness, as fully described herein below, can be formed. The process for forming the subject sheet product can be achieved at low manufacturing costs and in an environmentally desirable manner.

The sheet product of the present invention is composed of a polyolefin composition having two major surfaces and a thickness there between. The thickness (or body) of the sheet product is composed of a series of alternating layers or regions of relatively larger pore structure and of smaller pore structure. Each of the layers of the sheet product's thickness is oriented substantially in the same direction with respect to (substantially parallel to) each of the major surfaces. The layers forming the major surfaces of the sheet product being of the smaller pore structure design and all of the pores of the sheet product are microporous and have a narrow pore size distribution.

The present sheet product is formed by extruding or shaping, as an initially shaped material, a mixture composed of a moderate molecular weight polyolefin having at least 30 percent crystallinity and from 20 to 80 weight percent based on the total weight of the mixture of an organic fluid having a boiling point within the range of from 135 to 300° C. and a vapor pressure of from at least 1 to about 50 mm Hg at 70° C., and for which the polymer is at least partially soluble. The initial mixture is formed by blending the polymer and fluid at elevated temperature. During the formation of the initial mixture, the polymer mass loses a substantial degree of its crystallinity. Upon formation of the initially shaped material (e.g. by extrusion through a slit die head of an extruder), or after an optional air space residence after initial shaping, the initially shaped material is immersed in a cooling bath, maintained at a temperature below 100° C., comprising at least 75, preferably substantially 100 weight percent of the identical organic fluid utilized in forming the initial mixture of polyolefin and fluid, for a residence time sufficient to solidify the shaped material.

The cooled shaped sheet material is then subjected to a two step stretching/fluid vaporization of the sheet with removal of defined amounts of the fluid from the shaped material. In the first stretching/fluid vaporization step, the initially shaped material is stretched at least 225 linear percent in at least the machine direction. It may also be stretched from 125 to 700 linear percent in a direction transverse to the machine stretched direction while maintaining the sheet material at certain prescribed temperature, as described herein below. Simultaneously with the first stretching, a portion of the fluid is removed from the initial shaped material by vaporization to produce a first stretched shaped material having certain defined residual fluid therein and having the polymer therein exhibit polymeric crystallinity of about 40 to 85 percent. The first stretched shaped material is then subjected to a separate second stretching/vaporization step with stretching in the transverse direction (and, optionally, in the machine direction) at a certain prescribed temperature that is lower than that used in the first stretching step while concurrently removing a major amount of the remainder of the fluid contained in the first stretched shaped material. Optionally, in addition to vaporization which is performed concurrently with the first and/or with the second stretching, additional fluid vaporization may be performed to the first or second sheet materials to adjust the fluid content to that prescribed by the present method to achieve the presently taught target residual fluid content. The resultant second stretched shaped material is subjected to certain prescribed elevated temperature for a period of time of from 1 to 300 seconds while under machine and transverse tension to produce the desired resultant sheet product. The sheet product may be optionally relaxed in one or both stretched directions (length and/or width of about 10% reduction) as known in this industry to further improve dimensional stability. The stretching must be conducted to provide bi-axial two dimensional orientation of the sheet material. The stretching may be performed in each of the two directions either by sequential steps or simultaneously in one or multiple steps. Controlled amounts of the organic fluid used to form the initial composition and the shaped material is concurrently vaporized and removed from the sheet material during each of the first and second stretching steps. The liquid is preferably recovered, collected and recycled for use in forming subsequent mixtures suitable for forming initial sheet material or as part of the cooling bath or both.

DETAILED DESCRIPTION OF THE INVENTION

Figure 1:
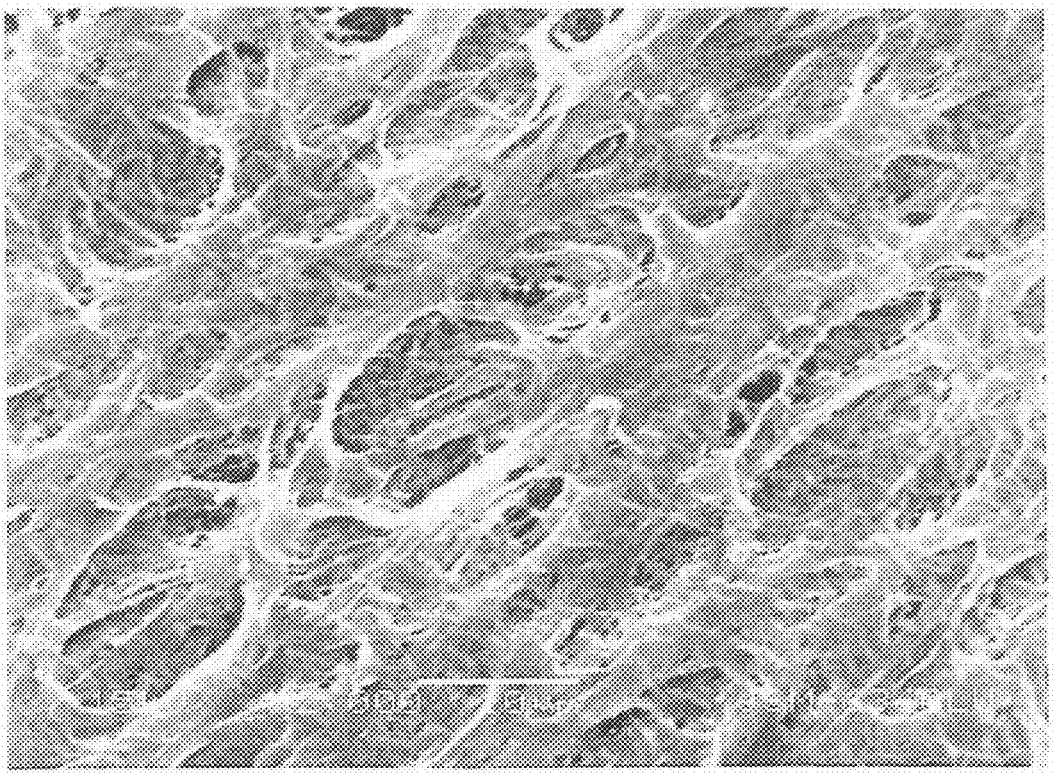
FIG. 1 is a micrographic picture (×2000 enlargement) showing the surface of a separator formed with fluid having vapor pressure at the extreme of the acceptable range. The surface has some large pores as well as areas containing very small pores.

The sheet product of the present invention is a highly porous unitary article suitable for use as an improved battery separator. The sheet product can be viewed as having two major surfaces with a thickness there between. The thickness is composed of a series of alternating first and second interconnecting layers (or regions or strata), running substantially in the same direction as the major surfaces of the sheet product. Each of the first strata lying within the unitary sheet product are microporous with average pore size of from about 0.01 to 2 microns (or micrometers), preferably from about 0.01 to 1 micron, more preferably from about 0.01 to 0.5 micron, while each of the second strata lying within the unitary sheet product of the present invention are microporous with average pore size of at least about 2 microns, preferably at least about 5 microns from the material cross sectional view. The pores of the second layer are of larger pore size than those formed in the first layers and may be up to about 100 microns. Further, the aspect ratio of the pores of the second layer are at least 3:1, with 5:1 and even 10:1 being common. The overall sheet product has a porosity of at least 30% by volume and the overall porosity characteristics is substantially that of the first layers: that is, having overall pores size of up to about 2 microns, preferably up to about 1 micron. The sheet product has first layers forming each of its major surfaces. Although the thickness of the present sheet product is composed of multiple layers, each layer is bound to the adjacent layer at the layers interfacial boundaries by connective polymeric elements to achieve a unitary structure.

The formation of a sheet product having the layered or stratified configuration described above in which alternating layers are of small pore configuration and large pore configuration is a desired product. The overall pore size (determined by Bubble Point method) of the sheet material is substantially that of the small pores; that is, the overall pore size is about or less than 2 microns, and in most cases, less than about 1 micron. The formed sheet product has a bimodal porosity which provides a product suitable for battery separator usage. The small pores readily retain the electrolyte to give good wicking properties and, thus, hold the electrolyte in close proximity to the electrodes of the battery. The large pores provide a cushioning element which allows the compression of the material to occur within the sheet product and, thereby, exhibit resilience and ability to reform into its original configuration. Thus, the present sheet product exhibits high wicking properties to provide even distribution of electrolyte over the adjacent electrode surface. Further, the sheet product is capable of permitting very high ionic conductivity throughout the battery system. Still further, the present sheet product exhibits very high puncture strength which inhibits dendrite formation within the battery system. Finally, the sheet product of the present invention is capable of undergoing compression and expansion forces encountered in alkaline, such as lithium, battery design.

For purposes of clarity, some of the terms used herein and, in the appended claims to describe the subject invention are defined herein below:

The term "sheet material" is intended to define a unitary article having two large surfaces with respect to its length and breadth dimensions and having a thickness between said surfaces. In general, the term is used to describe structures achieved during the initial extrusion or shaping of material into a sheet-like form and of material produced during any of the intermediate steps taught for forming the final sheet product.

The term "sheet product" is intended to define a unitary resultant article having two large surfaces with respect to its length and breadth dimensions and having a thickness between said surfaces. The thickness of the resultant article is composed of a series of alternating layers or regions of very small and larger microporosity with each of the surface layers composed of the smaller microporosity layers. The thickness of the sheet product is about 0.1 to 10 mil (0.0025 to 0.25 mm) with from 0.5 to 2 mils (0.0125 to 0.05 mm) being preferred.

The terms "layer" or "region" or "strata" are used interchangeably to define a distinct portion of the thickness of the unitary sheet product which runs in substantially the same length and breath direction as that of the major surfaces although in a somewhat tortuous manner. Thus, a layer may be positioned in a substantially parallel relationship to the major surfaces of the sheet product. Each layer or region may form, merge or discontinue within the sheet product structure.

The term "first" is intended to modify terms that reference to a layer, strata or region having average pore size of from about 0.01 to 2 microns, preferably from 0.01 to 1 micron, more preferably from 0.01 to 0.5 micron and have average pore size that is smaller than that of the alternating layer adjacent thereto. The term "first" is also used to modify and reference the liquid used to be mixed with and form the sheet material achieved during the initial extrusion or shaping of material and the sheet material produced by the initial process step of the multi-step stretching/fluid vaporization of the sheet material.

The term "second" is intended to modify terms that reference to a continuous or discontinuous layer, strata or region of porosity having average pore size (related to larger pore dimension) of at least 2 microns, preferably above 5 microns, up to about 100 microns and have average pore size that is larger than that of the alternating layer adjacent thereto. The term "second" is also used to modify and reference the second process step of the multi-step stretching/fluid vaporization of the sheet material after that initially formed and to distinguish the sheet material formed by the second stretching/fluid vaporization step.

The terms "fluid", "liquid" or "solvent", used interchangeably, refer to liquid components used in the formation of the initial polymer/fluid mixture to form sheet material. These terms are also used in reference to a liquid used in forming the cooling bath for initial cooling of the formed sheet material, process fluid used in other steps forming the subject sheet product and for the fluid removed by each of the stretching/fluid vaporization steps.

The term "major surface" is intended to refer to an outer surface of the sheet product and the layer adjacent to said major surface. A first layer (with one side exposed) forms each of the major surfaces of the sheet product.

The term "separator" is intended to refer to a component of a battery, in particular a storage battery, by which the component maintains a separation between adjacent electrode plates or elements of opposite polarity. The separator may be of various configurations, such as flat (preferred), ribbed, corrugated sheet which may be in the form of a membrane or envelope capable of maintaining separation of adjacent electrodes. The separator of the present invention has a thickness of from 0.1 to 10 mil (0.0025 to 0.25 mm) although the exact thickness will be based on the battery design for which it is intended.

The term "dendrite" is intended to refer to growths that develop on and extends outward from the surface of an electrode element and is due to the replating of electrode material during cycling of the battery. Dendrite formations that transverse through a separation from one electrode to another electrode of opposite polarity may cause shorting of the battery cell.

The term "fluidity" is intended to refer to polymeric compositions that exhibit flow properties that is caused by the physical ability of the polymer molecules of the composition to slide over one another. This ability is enhanced by the inclusion of a fluid material, especially when the polymer has minor (low) solubility properties with respect to the fluid component in contact therewith.

The term "crystallinity" refers to regular or structured orientation of polymer molecules with respect to each other within a polymer mass and is distinguished from random, irregular orientation of polymer molecules within a polymer mass to give an amorphous material. The crystallinity of a polymer mass can be determined in known manners by conventional x-ray diffraction analysis.

The polymers found useful in forming the sheet product of the present invention can be selected from thermoplastic polymers capable of forming a microporous sheet as, for example, polyolefins, and the like. The preferred class of polymers used in the present invention is polyolefins. The polymeric composition may further contain small amounts of fillers, colorants, anti-oxidants, stabilizers and the like. Although solid particulate materials are not a desired component of the initial polymeric composition forming the sheet material and the resultant sheet product, when present they should be limited to less than 10 weight percent (preferably less than 5 weight percent) of the polymeric composition used in forming the initial polymeric sheet material, as described herein below. The remainder of the description of the present invention shall be illustrated by the use of polyolefins to form the present sheet product and separators therefrom.

The preferred polymers for use in forming the first sheet material and the resultant sheet product of the present invention are polyolefins, either in the form of homopolymers or copolymers, such as polyethylene, polypropylene, ethylene-butene copolymers, ethylene-hexene copolymers and the like and mixtures thereof.

The thermoplastic polymer, such as polyolefins, should be selected from polymers having a weight average molecular weight of from about 20,000 to about 1,000,000 with moderate molecular weight of from about 200,000 to less than 400,000 being most preferred. Furthermore, the preferred polymers have a Melt Flow Index (MFI) below about 0.8, preferably at a range of from below 0.1 to 0.001. Molecular weights above 1,000,000 generally have MFI of 0. Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method for determining MFI is described in ASTM D1238 and ISO 1133. Melt flow rate is an indirect measure of a polymer's molecular weight.

The most preferred polymers are polyolefins selected from polyethylene and polypropylene homopolymers as well as copolymers of these polymers having small amounts of up to 10, preferably from 1 to 10 weight percent of other alpha-olefins ($C_3$-$C_{10}$ alpha olefins) as co-monomeric units therein, such as propylene, butene-1, hexene-1, etc. and mixtures thereof preferably produced using a single-site catalyst polymerization. The polyethylene may be selected from high-density polyethylene, medium-density polyethylene, branched low-density polyethylene, and linear low-density polyethylene, and its weight average molecular weight (Mw) is preferably $2 \times 10^4$ to $1 \times 10^6$. More preferably, the polyethylene is a high-density polyethylene having a Mw of from $1 \times 10^5$ to $5 \times 10^5$, most preferably a Mw of $2 \times 10^5$ to $4 \times 10^5$.

The polyolefins used in forming the initial mixture have crystallinity of at least 30 percent, with crystallinity of from 30 to 90 percent being preferred and from 40 to 85 percent being most preferred.

The sheet product of the present invention may be formed with multiple polymers. For example, polyethylene may be blended with a second polymer, such as polypropylene, a fluoropolymer and the like, in varying percentages or by blending different molecular weight material of the same polymer (e.g. polyethylene) to form an initial sheet material and ultimately, a singular sheet product. Multiple unitary sheet products of the present invention may be combined to form a laminate structure. The laminate sheet material, whether of one polymer formed from initial mixtures of different composition or using different polymers can be readily formed using conventional multi-sheet extrusion head devices (e.g. co-extrusion) to achieve the first sheet material which is further processed according to the present invention.

The first fluid used in the formation of the initial sheet material should be selected from organic fluids that are capable of providing at least minor solubility with respect to the chosen polymer. Thus, the fluid acts as a sufficient solvent with respect to the polymer to allow the polymer and fluid to form a uniform polymeric mixture having fluidity at elevated temperatures (100 to 250° C.) to provide an initial sheet material. The fluid used according to the present invention should be selected from low molecular weight, high vapor pressure organic liquids, such as mineral spirits, lower molecular weight alkanes, $C_9$ to $C_{20}$ aliphatic, alicyclic or aromatic hydrocarbons, such as nonane, decane, p-xylene, undecane, dodecane octadecane to icosane and the like and mixtures thereof. The fluid should have high vapor pressure of about 1 to 50 (e.g. 1-5, 5-10, 10-20, 20-40) mm Hg at 70° C. (preferably also having a vapor pressure of 0.1 mm Hg to about 5 mm Hg at 20° C.). Fluids found useful in forming the present sheet material and resultant sheet product should have a boiling temperature of from at least 135 to 300° C. (275 to 572° F.), with boiling temperatures from about 170° C. to about 250° C. (338 to 482° F.) being preferred. Finally, the first fluid should have a flash point characteristic within the range from 30 to 170° C. (86 to 338° F.). A preferred fluid is a mixture of fluids having a boiling range (initial to final boiling points) of at least 10° C., more preferably 15° C., most preferably 20° C. in breadth, enhancing the ability to provide controlled multiple temperatures and multiple steps solvent evaporation.

The polymer and first fluid are mixed together to form a substantially uniform composition. The mixing is normally done prior to or as part of the formation of the first shaped material, such as by feeding the polymer and fluid into a single or twin screw feed chamber of an extruder. Such extruders are well known and are illustrated by WO 2009/51278; WO 2007/46 496; WO 2007/73 019; and WO 2008/72 906. Though not particularly critical, the uniform melt-blending of the polyolefin solution is preferably conducted in a double-screw extruder. The membrane-forming fluid may be added before starting melt-blending, or supplied to the extruder in an intermediate section of the blending.

The first fluid forms from 20 to 80 weight percent, preferably from 30 to 75 and most preferably from 40 to 70 weight percent of the resultant mixture. The mixture is heated to a temperature which is higher than the melt temperature ($T_m$) of the polymer measured by conventional differential scanning calorimetry (DSC) while, at the same time, being below the boiling point temperature of the fluid. Temperatures of from about 100° C. (212° F.) to about 250° C. (482° F.), preferably of from 150° C. (302° F.) to 200° C. (392° F.), are normally suitable while subjecting the mixture to shear forces to cause the components to form a uniform mixture prior to being shaped (such as by extrusion through a die head) into the initial shaped sheet material. The polymer normally looses the majority if not all of its crystallinity properties during this operation.

The formed mixture may be shaped into an initial sheet material by any means, such as by extrusion of the initial mixture through an extrusion die. Such forming of the initial sheet material is normally conducted at elevated temperatures indicated above for the mixing of the fluid with the polymer. The shaped sheet material should have a thickness that is sufficient to permit the contemplated stretching to be conducted without causing disintegration of the material. The proper thickness can be readily determined by the artisan during the conducting of the present process and is normally from about 0.1 to 5, preferably from 0.2 to 3 and most preferably from 0.2 to 2 mm.

The initially shaped sheet material is cooled by immersing the formed shaped sheet material into a cooling bath composed a second fluid formed of at least 75 weight percent (preferably 80, more preferably 90 and most preferably 100 weight percent) of the same fluid (first fluid) used to form the initial polymer/fluid mixture and is contained as part of the initial shaped sheet material. It is most preferred to have the first fluid and the second fluid be of the same composition and also to be 100 weight percent of a single liquid in order to aid in handling and ease of allowing for recycling of the captured fluid, as described herein below. When the same low molecular weight fluid makes up less than 100 weight percent of the second fluid, the remaining fluid should be chosen from organic fluids that are miscible with the first fluid and have boiling point, flash point and vapor pressure properties within the same ranges indicated above for the first fluid. The cooling fluid (second fluid) is maintained at a temperature of up to 100° C. (preferably from 0 to 100° C. and most preferably from 20 to 90° C.). The initially shaped sheet material resides in the second fluid for a sufficient time to reduce the temperature of the sheet material below the melt temperature of the polymer. The initially shaped sheet material normally resides in the cooling fluid for up to about 90 seconds, preferably from about 1 to 90, more preferably from 1 to 60 seconds and most preferably from about 5 to 60 seconds. The time is preferably of sufficient duration to cool the initial shaped sheet material to below the $T_m$ of the polymer used.

Optionally, the initially shaped sheet material may be passed through an air space prior to being immersed in the cooling fluid, as described above. The air space may be maintained at ambient temperature or at a temperature within the range of from about 0 to 100° C. The residence time which the sheet material is in the air space, when used, is short such as from about 0.01 to 8 seconds. The space may be filled or partially filled with common air or an inert gas such as nitrogen or gaseous vapors of the first fluid or mixtures thereof, with substantially, nitrogen filled space being preferred.

The formed initially shaped sheet material, as it is produced by the extruder or other selected shaping device is composed of the selected polymer(s) and fluid. The first fluid forms from 20 to 80 weight percent, preferably from 30 to 75 and most preferably from 40 to 70 weight percent of the resultant mixture. The crystallinity of the polymer of the shaped sheet is normally substantially amorphous although it may still retain a residual degree of the original crystallinity of the selected polymer feed. Upon cooling of the initial sheet material some polymer re-crystallization may occur. Thus, the cooled initial sheet may exhibit polymer crystallinity of up to about 30 percent, commonly less than 20 percent, such as less than 10 percent by mass.

The shaped sheet material is, upon cooling in the cooling bath described above, then subjected to a two-step stretching/fluid vaporization processing. In the first step, the cooled, shaped sheet material is stretched in at least one direction. This first direction of stretching is usually conducted in the machine direction from which the initial shaped sheet material is exiting the extrusion die head and the cooling bath. The stretching can be readily accomplished, for example, by passing the shaped sheet material through nip rollers of a set rotation rate and then through a second set or subsequent sets of nip rollers prior to a take-up roller. Alternately, other conventional stretching means can be used, such as a tenter method, an inflation method or a combination thereof. The stretching may be conducted monoaxially or biaxially (machine and transverse directions), though the monoaxial stretching is preferable. In the case of biaxial stretching, any of simultaneous biaxial stretching, sequential stretching or multi-stage stretching (for instance, a combination of the simultaneous biaxial stretching and the sequential monoaxial stretching) may be used.

The initial shaped sheet material should be first stretched at least about 2.25 fold of its initial dimension in one first direction (e.g. machine direction), with stretching of from about 2.25 to 10 fold being preferred and about 2.5 to 7 fold being more preferred and 3 to 6 being most preferred. This first stretching is done while maintaining the sheet material at an elevated temperature. The temperature should be maintained at from $(T_m-70)$ to $(T_m-20)°$ C., where $T_m$ is the melt temperature of the polymer, or the higher $T_m$ of the polymers forming a mixture of polymers, used to form the sheet material and resultant sheet product. For example, the stretching of a sheet material formed with polyethylene should be done at temperatures of about 71° C. (160° F.) to about 121° C. (250° F.), preferably of from about 77° C. (170° F.) to about 116° C. (240° F.)) and most preferably at a temperature of from about 96° C. (205° F.) to about 110° C. (230° F.) while, when using polypropylene, the temperature ranges given above will be about 20° C. higher. The stretching in the first direction may be accomplished in one step operation or in a series of stretching operations to achieve the desired degree of elongation of the sheet material. This stretching induces increased crystallinity to the polymer in the resultant first stretched sheet material. The stretching should be sufficient to cause reestablishing crystallinity to the polymer of the first stretched sheet material. The crystallinity of the polymer should be at least about 40%, preferably at least about 50% by mass. When the crystallinity produced is at lower values, the resultant sheet product exhibits very high resistivity values (ohm-cm) and, thereby, is not a highly desired product for battery separator utility.

During the first step of the two step stretching/fluid vaporization process, the fluid is allowed to be removed from the first sheet material by vaporizing, preferably with collection and condensation of the gaseous vapor material. This vaporization should be conducted concurrently with the stretching of the first sheet material. The vaporization and collection of the gaseous stream may be conducted by tenting the stretching apparatus and having an inert gaseous (e.g. air, nitrogen, etc.) flow over the first sheet material to aid in the removal of vaporized fluid from the first sheet material. The gas should be at an elevated temperature, such as the temperature described above for conducting the stretching. Alternately, the stretching apparatus can be contained within a confined space having reduced atmospheric pressure. The vaporized fluid should be collected and condensed by passing over a cold surface held at a temperature of from 0° C. to lower than the boiling temperature of the fluid being collected, such as through a condensation apparatus.

The first stretched sheet material obtained from the first step stretching/fluid vaporization described above, results in a sheet material that is substantially non-porous. It is presumed, though not deemed a limitation of the invention, that this may be due to the re-crystallization and collapsing of the polymeric material forming the first stretched sheet onto itself.

Figure 5:
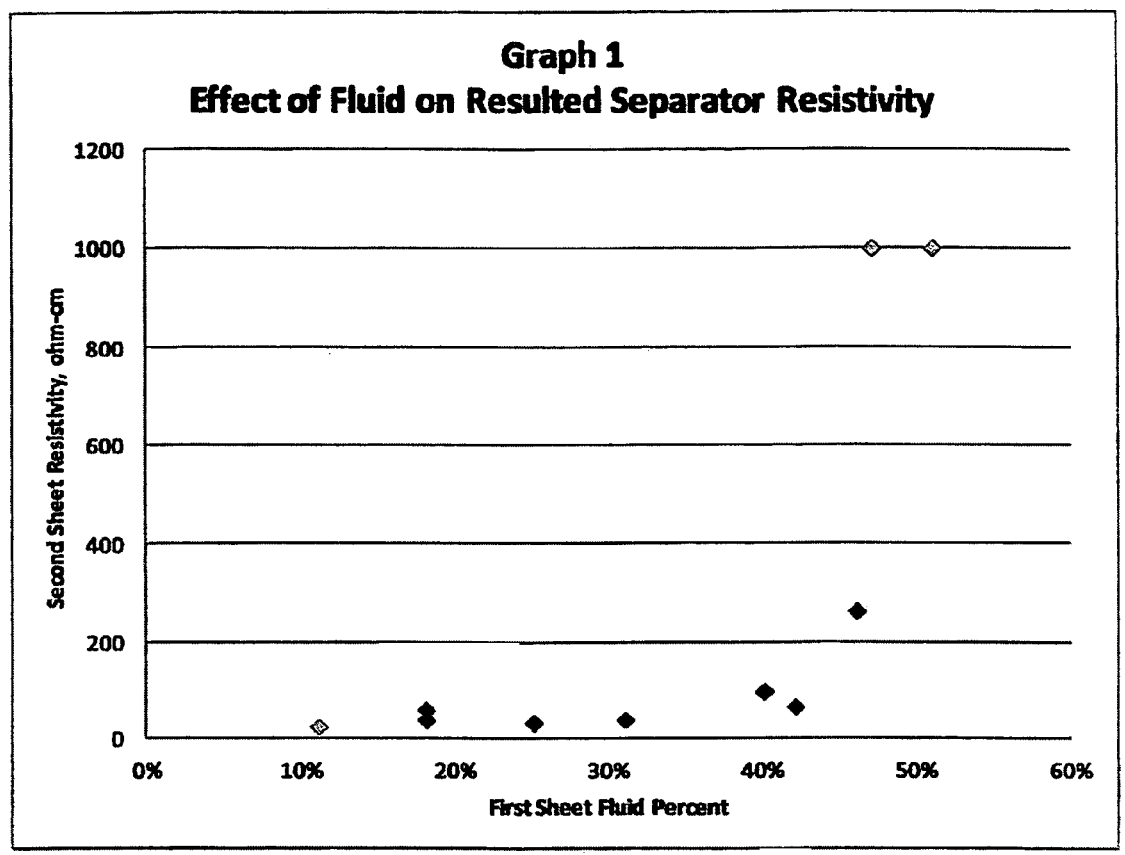
FIG. 5 is a graphic presentation showing the effect of resistivity of the resultant sheet product with respect to amount of fluid retained in the first shaped material after first stretching and concurrent removal of fluid.
Figure 6:
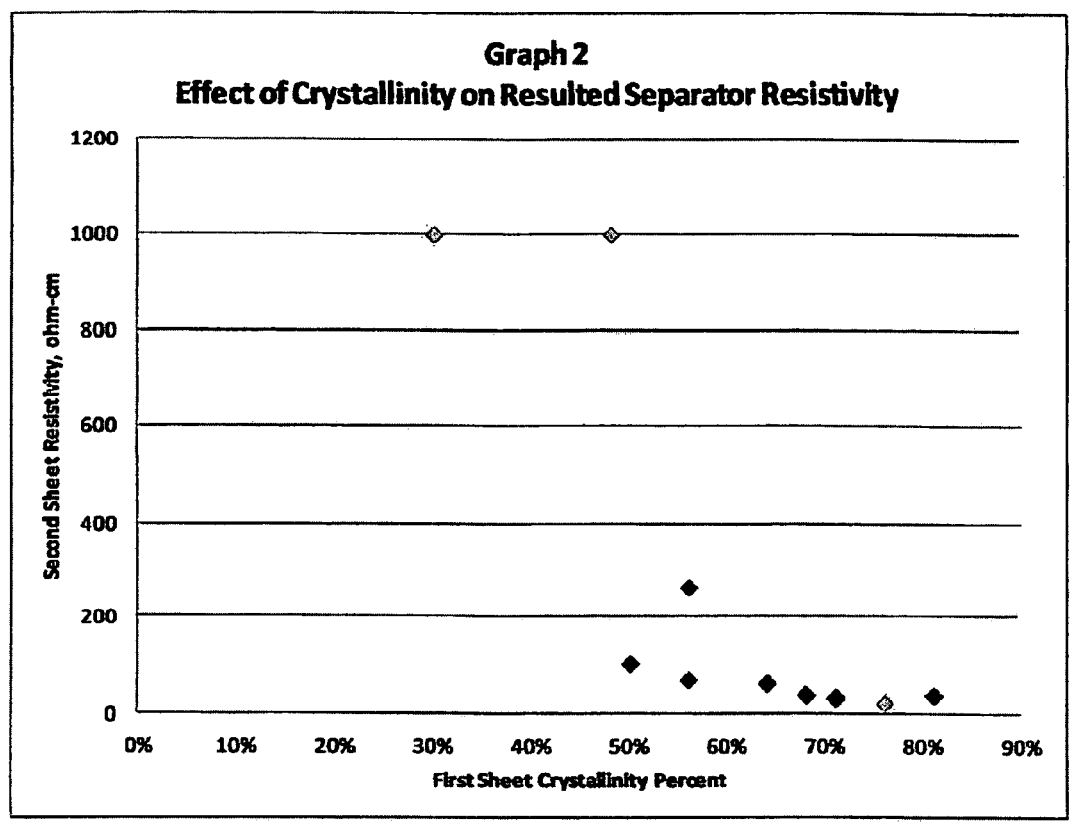
FIG. 6 is a graphic presentation showing the effect of resistivity of the resultant sheet product with respect to the degree of crystallinity imparted to the polymer of the first shaped material after first stretching and concurrent removal of fluid.

The polymer of the resultant first stretched sheet material should have a degree of crystallinity of at least 40%, usually from 40 to 85% (preferably from 50 to 80%). Further, the residual fluid contained in the initially stretched sheet material should be present in from 10 to 45 weight % (preferably from 15 to 40 weight %) of the initial shaped sheet material. Residual fluid substantially below 10% results in breakage and non-uniformity of the sheet on second stretch. The amount of fluid allowed to be retained will preferably be proportionate to the crystallinity of the polymer. Thus, when the polymer of the first stretched sheet material exhibits a high range (e.g. 70 to 85%) of crystallinity after the first stretching, the fluid is preferably present in its upper range (e.g. 35 to 45 weight %). It has been unexpectedly found that when the first step of the two step stretching/fluid vaporization is conducted, as described above to result in a first sheet material having residual fluid of up to about 45% and polymer crystallinity of higher than 50%, one unexpectedly attains a resultant sheet product of low electrical resistivity of less than about 250 ohm-cm and, in most instances, less than about 100 ohm-cm (see FIGS. 5 and 6). In addition, the resultant sheet product exhibits high wicking properties, as shown by achieving a wicking rate of less than 200 seconds, more often less than 100 seconds and most preferably less than 70 seconds, by 30 mg of applied organic solvent (i.e. isopropyl alcohol) traveling from the center of a one inch diameter circle area to the circumference of the area with respect to a 20 micron thick, horizontally positioned sample of resultant sheet product.

Furthermore, the resistance of the sheet product can be correlated to the residual fluid and crystallinity percentages of the first material by the following approximation:

$$\text{Log } r = 2(f/c) + 1$$

Figure 7:
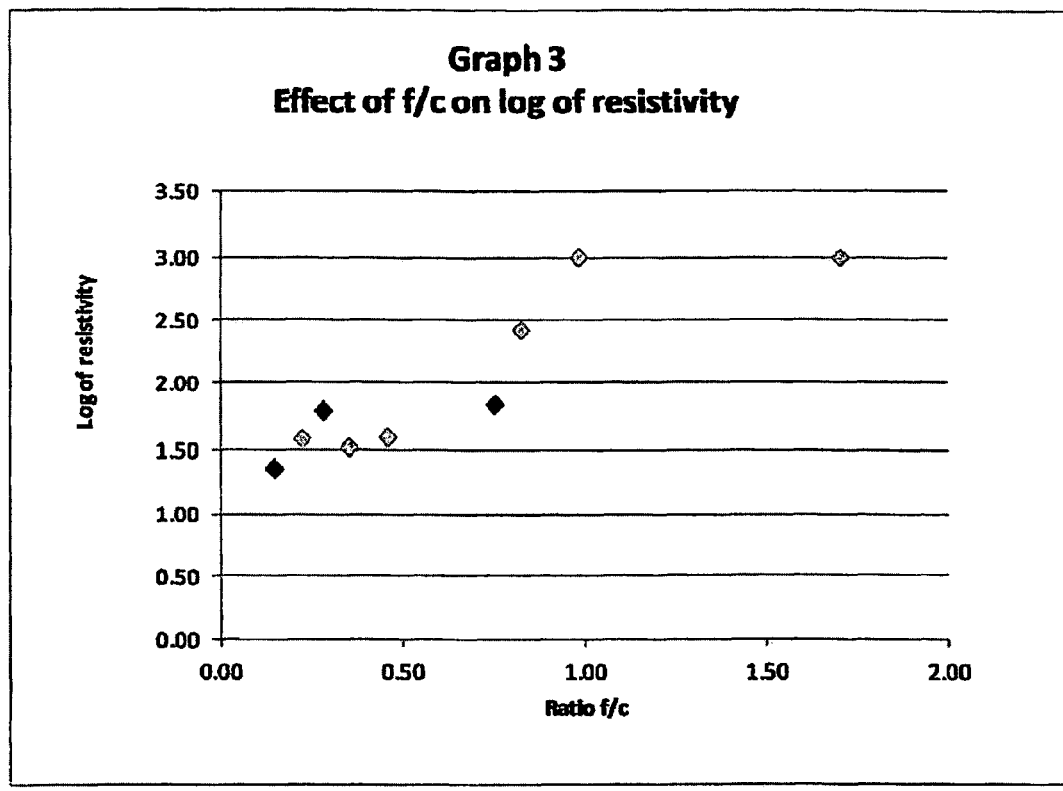
FIG. 7 is a graphic presentation showing the effect of resistivity (in the logarithmic form) of the resultant sheet product with respect to the ratio of amount of fluid (f) retained and the degree of crystallinity (c) imparted to the polymer of the first shaped material after first stretching and concurrent removal of fluid.

Where,
r=resistivity ohm-cm of sheet product in 30% KOH
f=fluid % of first stretched material
c=crystallinity % of first stretched material
log r under the currently conducted test procedure has a maximum of 3, or a resistivity of 999 ohm-cm The relationship is graphically represented in FIG. 7. The above formula provides an approximate relationship among the fluid content of the first stretched material, the polymer crystallinity of the first stretched material and resistivity of the resultant sheet product. The approximation indicates to achieve low resistivity, the f/c ratio should be up to 1.0, preferably between 0.15 to 0.9, more preferably between 0.15 to 0.8 and most preferably between 0.2 to 0.7 (e.g. 0.75), resulting in a sheet product having resistivity (r) below about 100 ohm-cm (log of resistivity being 2).

The first stretched sheet material is, subsequently to the first step stretching/fluid vaporization described above, subjected to a second stretching/vaporization step. This second step is conducted by stretching the first sheet material in at least one second direction which is transverse to the first direction (e.g. when only machine direction is used in first stretching described above than the first sheet material is stretched in the direction transverse thereto) of the initial stretching described above. The stretching can be accomplished by a conventional tenter machine. The tenter basically has a set of tracks which are able to grip the sheet product on both edges and pull the sheet further apart as the sheet moves through the tenter. The tenter is well known in the industry for oriented film processing. The stretching of this second step is conducted in a direction that is transverse to the direction (when only one direction is used in first stretching) direction used in the first stretching. If first stretching is both in the machine and transverse directions than the second stretching can also be done in either or both directions and can be accomplished either simultaneously with or sequential directional stretching. This second step stretching should be conducted at a temperature that is at least about 20° C. lower than the operating temperature of the first step process, more preferably at least about 30° C. lower. For example, temperatures of from ambient to about 95° C. (203° F.) and, preferably, at temperatures from about 38-77° C. (100 to 170° F.) are useful for a polymer of low melt temperature ($T_m$) (e.g. polyethylene), and with about 20° C. higher values for a high melt temperature ($T_m$) polymers, such as polypropylene. The stretching of the first sheet material in one or both directions is from about 1.25 to 7 fold (125-700%) of the initial dimension of the first stretched sheet material.

The second step stretching/fluid vaporization shall also concurrently include further vaporization and removal of fluid remaining in the sheet material. The vaporization and removal of the fluid (and optional collection) may be conducted in the same manner described above with respect to the first step stretching/fluid vaporization. Upon completion of the stretching of the sheet material, the sheet will normally be substantially free of or have only low amounts of residual fluid, from about 10 to about 45 (e.g. approaching the amount of fluid retained in the first stretched sheet material), preferably from 10 to 40 and most preferably from 10 to 20 weight percent fluid remaining, depending on the amount of residual fluid from the first stretched sheet material.

The sheet material is intended to have a first and second (e.g. machine and transverse) stretches to produce a sheet product. The combined stretches ratio being at least about 2.8 fold of its machine dimension, with stretching of from about 2.8 to 70 fold being preferred and about 3.4 to 49 fold being more preferred and 3.8 to 35 being most preferred. Depending on the machinery set-up, the first and second stretches are interchangeable when processed in sequence.

With the stretched sheet material under tension in at least one or both stretched directions, the second stretched sheet material is subjected to annealing, or elevated temperature sheet stabilization. Annealing temperature is typically conducted between ($T_m$–50) to ($T_m$–5)° C. with respect to the polymer $T_m$ forming the sheet product. For example, the preferred annealing temperature being from 110-138° C. (230 to 280° F.), more preferably from 120-132° C. (250 to 270° F.) for a polymer of low melt temperature ($T_m$) (e.g. polyethylene) with about 20° C. higher values for a high melt temperature ($T_m$) polymers, such as polypropylene. The completeness of annealing is a function of heat transfer effectiveness, temperature, residence time and relaxation. The stretched sheet material is maintained under these conditions for a period of time of from 1 to 300 (preferably from 5 to 120) seconds. The sheet product may be optionally relaxed in one or both stretched directions (length and/or width of about 5% to 20% reduction) as known in this industry to further improve dimensional stability. This anneals the sheet material to set the polymer in a fixed configuration to form the desired sheet product.

Upon completion of the stretching of the sheet material, the residual fluid in the sheet will be removed by vaporization during and/or prior to annealing. Residual amounts of fluid may also be removed subsequent to the annealing step. The resultant sheet product may have up to 10, preferably up to 5 and most preferably up to 1 percent by weight of residual first and second fluid. The process for removal of the residual fluid can be conducted by any means, such as passing the cooled sheet product over vacuum rollers or by any of the manners described above. The resultant sheet product has substantially less than about 1 weight percent of fluid in the product.

It is preferred to conduct the some or all of the above operations of mixing of the polymer and fluid, cooling operation, stretching in one or both directions as well as annealing, in sealed systems to readily permit capturing of the fluid's vapors. The trapped vapors may be then subject to condensation or absorption for recycling purposes.

When the first stretching and the subsequent transverse stretching are conducted at the preferred elevated temperature, as described above, the fluid(s) required for use in forming the initial sheet material is allowed to be released from it and can be recovered in a substantially pure state suitable for use for forming additional initial sheet material. The majority of the fluid(s) readily vaporizes out of the first and second stretched sheet material during the first and second stretching steps, respectively, conducted at elevated temperature. This is done without the need for removing the fluid(s) with a second extraction, liquid. The amount of residual fluid retained in the second stretched sheet material will depend on the process conditions of the first and second stretch steps prescribed above. Any residual fluid contained in the sheet material after stretching may be removed during the annealing operation. This residual fluid is combined with the prior captured fluid for recycling. The fluid can be removed under ambient or reduced pressure, with the aid of air flow or similar means followed by condensation to capture the fluid for recycling. Optionally, after the stretching operations or after the annealing operation, any remaining amount of fluid can be removed from the sheet product by conventional methods of subjecting the sheet product to air flow at ambient or elevated (e.g. up to about 60° C.) temperature or the like under ambient or reduced pressure in a separate chamber. Thus the fluids can be removed by vaporization during the first stretching, the second stretching, the annealing or as a separate step or as a combination of these steps.

The resultant sheet product is of a unique structure. The sheet product has a structure composed of two major surfaces and a thickness there between. The thickness is composed of alternating first and second microporous regions (layers running in the length and breadth direction of the sheet product), preferably with a first microporous region adjacent to and forming the majority of each of the two major surfaces. Each first microporous region having pores of average pore size of from 0.01 to 2 microns (preferably from 0.01 to 1 micron and more preferably from 0.01 to 0.5 micron) and have average pore size that is smaller than that of alternating second microporous region forming said sheet product. Typically, the first microporous regions have polymer filaments substantially parallel or aligned to the surfaces. The filaments form a stratified layered morphology. This facilitates liquid or electrolyte wicking performance. Each second microporous region having pores of an average pore size of at least 2 microns (preferably above 5 microns), an average aspect ratio of at least 3 to 1 (length to width on cross sectional basis of the sheet product) with from above 5:1 being preferred and above 10:1 being most preferred and have average pore size that is larger than that of the alternating first layer adjacent thereto.

Figure 2:
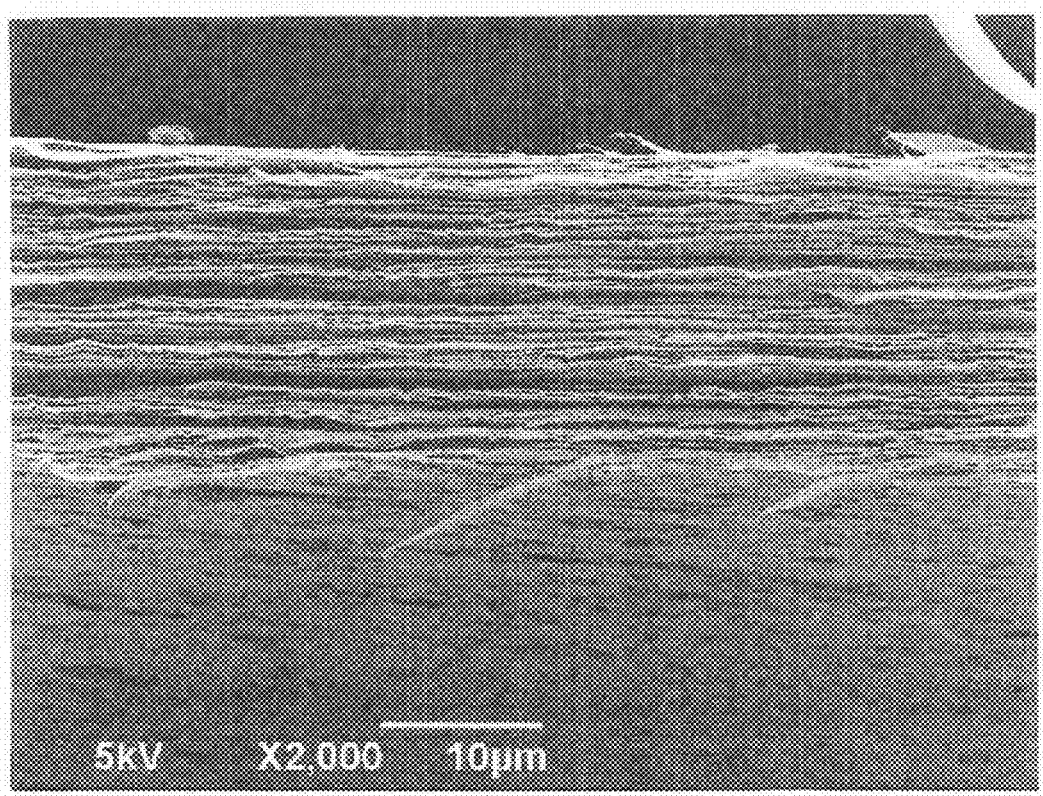
FIG. 2 is a micrographic picture (×2000) showing a cross-sectional area of the thickness of a separator formed according to the present invention. Note the alternating regions of larger pores and layers of polymer having smaller pores running across the thickness of the sheet material.
Figure 3:
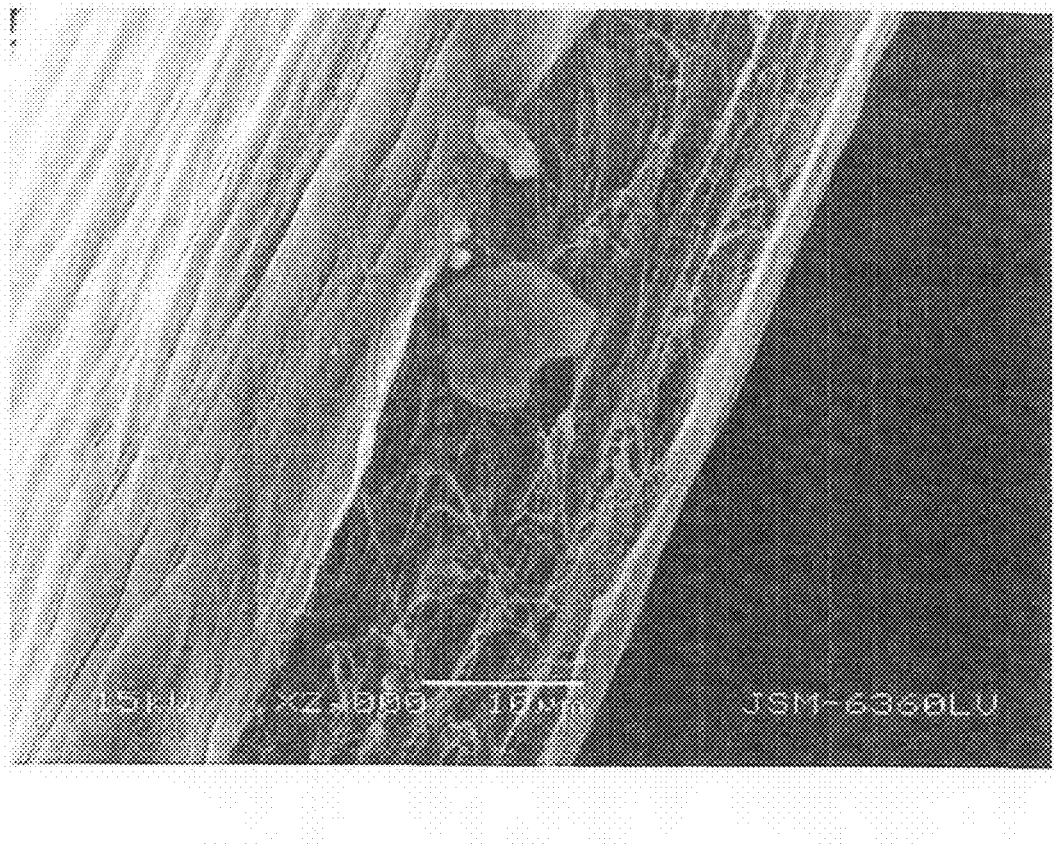
FIG. 3 is a micrographic picture (×2000) showing an oblique view of a separator sheet product according to the present invention. The left portion shows one surface of the sheet formed with a layer of small pore material. The center of the picture is of the cross sectional thickness of the present sheet product showing alternating smaller and larger pore structure.
Figure 4:
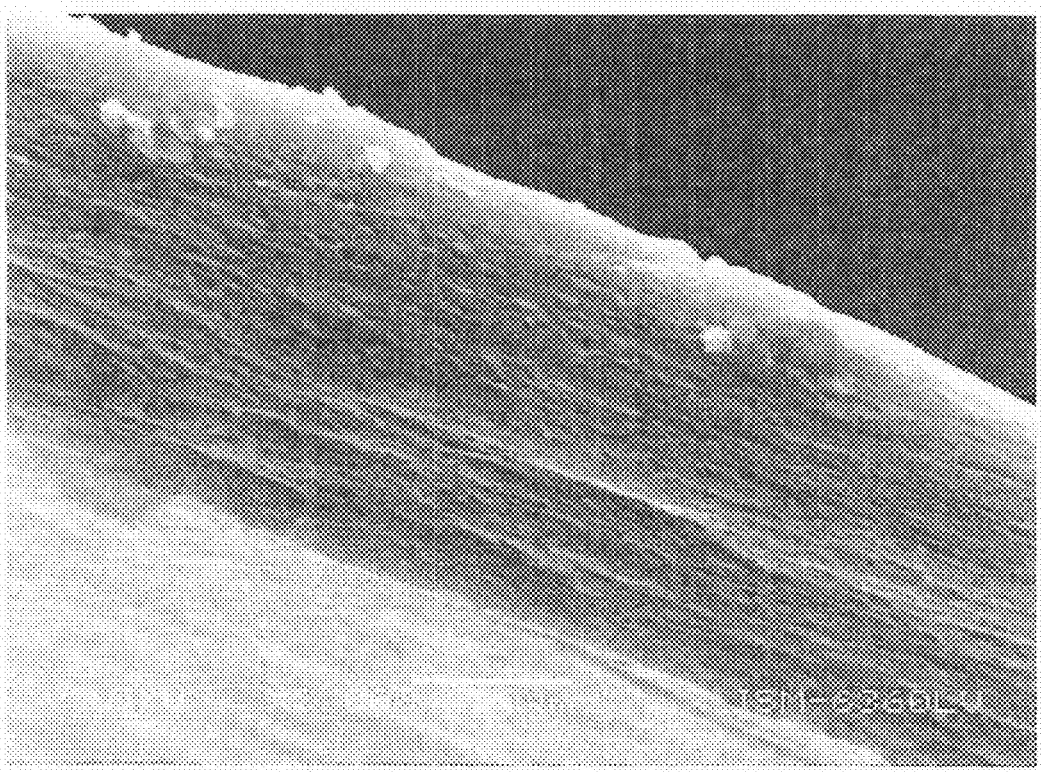
FIG. 4 is, for comparative purposes, a micrographic picture (×2000) showing, a commercial sheet product formed according to prior art. The sheet product has substantially uniform (not layered and not stratified) porous structure across its thickness (the center portion of the picture).

The present sheet product has at least 5, preferably at least 10, second layers per 20 microns of thickness and the first and second layers or regions are in alternating position throughout the thickness of the sheet product. This can be clearly viewed by the electron micrograph of FIGS. 2 and 3. The alternating regions are connected together at their interfaces by tying branches of polymeric material. Thus, the resultant sheet product is a unitary structure. The enhanced crystallinity (of from 65 to 90, preferably from 70 to 85 percent) imparted to the polymer in forming the resultant sheet product aids in achieving a sheet product of good integrity and strength.

Although the second regions contained within a sheet product have large pore size (usually greater than 2 microns), the overall average pore size of the sheet product is very narrow, taking on the characteristics of the limiting pore size of the first layer (from about 0.01 to 2 microns). Through the unique alternating structure and the very narrow pore size distribution, the present sheet product provides an improved battery separator that exhibits high conductivity (believed attributable to the large pore of the second regions) and fast wicking capable of holding of the electrolyte (believed attributable to the combination of large and adjacent small pores of the second and first regions, respectively). It is believed that the presently attained unique structure of the present sheet product may be attributable to the use of identical fluids as the fluid component of the initial sheet material and as the cooling fluid which contacts the initial shaped sheet material upon its formation, plus the concurrent stretching with polymer re-crystallization and fluid vaporization and removal from the sheet materials. Each of the above beliefs are not meant to be a limitation on the present description or the appended claims but is meant merely to try to explain the properties observed with respect to the resultant sheet product.

Finally, by using a low molecular fluid of high vapor pressure and low boiling point, as described herein above, and removing said fluid by vaporization of the fluid from the sheet material to ultimately form the resultant sheet product, one is able to achieve the desired sheet product while reusing the fluid. The waste stream, common with other known methods where the initial fluid is removed by extraction with a second fluid, is reduced or eliminated by the present process and is both an environmental as well as an economic benefit achieved by the present method.

The following examples are given for illustrative purposes only and are not meant to be a limitation on the invention described herein or on the claims appended hereto. All parts and percentages given in the description, examples and claims appended hereto are by weight unless otherwise stipulated. Further, all ranges of numbers provided herein above shall be deemed to specifically disclose all subset ranges of numbers within each given range.

EXAMPLES

The materials used were:
Polyethylene L5906 from Lyondell-Basell (MFJ of 0.06) having high degree of polymer crystallinity
Polyethylene 19A from Nova Chemicals (MFI of 0.7) having high degree of polymer crystallinity
Mineral Spirits (MSB) having vapor pressure 3 mm Hg at 20° C. from MW Barr & Co. Inc., Memphis Tenn.,
Mineral Spirits (MSC) from Citgo, with the following vapor pressure characteristics:

| Temp (° C.) | Vapor pressure (mmHg) |
| --- | --- |
| 66 | 3.3 |
| 93 | 15 |
| 121 | 44 |
| 149 | 122 |
| 177 | 302 |
| 204 | 663 |

The equipment used was:
Volumetric Feeder, Model # K2MVS60, by K-Tron Corp.
Fluid pump, Neptune model 515AN3
Twin Screw Extruder (ZSK-30) made by Krupp Werner & Pfleiderer Corporation, of Ramsey, N.J., 07446
Cast Film Take-up made by Killion Extruders, a Davis Standard Company, of Pawcatuck, Conn.
Bi-orientation tenter frame made by Marshall and Williams, of Woonsucket, R.I.

The following procedure was used to form each of the sheet products described in the Tables 1 and 2 herein below as well as each of the comparative sheet products summarized in Table 3 herein below.

Specified parts of polymer were fed into a twin screw melt extruder via a volumetric feeder. The polymer was allowed to melt within the extruder and then specified parts of fluid were introduced into the extruder via a metered pump. The polymer and fluid was blended into a uniform fluid mixture. The total extrusion rate was set at between 3 to 5.3 kg/hr, as specified. The mixture was formed into a sheet via a slit die. The sheet was cast into a liquid cooling bath maintained at 49° C. formed of the same fluid as used to form the polymer/fluid mixture. The sheet material was transformed from the liquid phase to a solid phase sheet material.

The sheet was removed from the cooling bath by a take-off roller at an indicated cast speed to provide a sheet thickness suitable for being subjected to stretching. The sheet was sequentially stretched using a series of nip rollers in the machine direction using a series of nip rollers with each stretching conducted at a controlled temperature. The total stretch ratio is the product of the combination of each of the stretch ratios. Each stretching operation was conducted in a confined environment with a current of air passing over the sheet material to aid in vaporizing and driving off the vaporized fluid. The vapors from the first stretch were passed through a heat exchanger and allowed to condense for collection. This first stretching/vaporization was conducted to cause crystallinity to be imparted to the polymer of the first formed sheet while allowing a predetermined degree of fluid to remain.

The sheet was then subjected to stretching in a second transverse direction at a controlled elevated temperature(s) using a tenter apparatus. The stretching was conducted in a confined environment with a current of air passing over the sheet material to aid in vaporizing and driving off the vaporized fluid. The vapors from the second stretch were collected.

The tenter force was adjusted to allow the sheet to be held under tension at elevated temperature for 60 seconds to anneal and set the sheet product. The properties of each of the formed sheet product is given in the below tables.

The particulars with respect to each of the samples summarized in the below Tables 1, 2 and 3 are given herein below:

Example 1

Polymer type 19A at 41% was mixed with 59% of MSB fluid in an extruder. The cast film was cooled and subsequently stretched in the machine direction in four sequential steps. The stretch ratios and temperatures are listed in Table 1, indicated as 1.5, 1.4, 1.4 and 1.5 times with the corresponding temperature of 60, 71, 82 and 94° C. (140, 160, 180 and 200° F.), forming the first sheet material. The first sheet material was subsequently stretched in the transverse direction at a ratio of 3.5 times at a temperature of 71° C. (160° F.) for all three zones used (preheat, stretch and heat-anneal). The finished sheet product was tested to contain less than 0.1% of residual fluid. The material exhibited a porosity of 84%, resistance of 30 mohm-cm.sq., resistivity of 6 ohm-cm and a wicking rate of 55 seconds.

The wicking rate test was conducted using one drop (30 mg) of isopropyl alcohol (IPA) placed on a piece of formed battery separator placed in the horizontal position. The rate was determined as the time it took for the IPA to wick from the drop center to a one inch distance (i.e. the edge of an one inch pre-marked circle). The IPA wicked separator area had a visual transformation from opaque white in color to transparent, indicating the saturation of IPA into the pore volumes of the wicked separator area.

Example 2

Polymer type L5906 at 36% was mixed with 64% of MSC fluid in an extruder. The cast film was cooled and subsequently stretched in the machine direction in four sequential steps. The stretch ratios and temperatures are listed in Table 1, indicated as 1.5, 1.2, 1.2 and 4 times with the corresponding temperature of 71, 80, 88 and 110° C. (160, 175, 190 and 230° F.), forming the first sheet material. The first sheet material was subsequently stretched in the transverse direction at a ratio of 2.5 times at a temperature of 32, 32 and 110° C. (90, 90 and 230° F.) for the corresponding preheat, stretch and heat-anneal zones. The finished sheet product tested to contain less than 0.1% of residual fluid. The material exhibited a porosity of 57%, resistance of 40 mohm-cm.sq., resistivity of 17 ohm-cm and a wicking rate of 25 seconds. The resulted product had a thickness of 24 microns and 440 gram force puncture strength. The tensile strength performance is listed in Table 1.

Example 3

Polymer type L5906 at 45% was mixed with 55% of MSC fluid in an extruder. The cast film was cooled and subsequently stretched in the machine direction in two sequential steps. The stretch ratios and temperatures are listed in Table 1, indicated as 1.5 and 4 times with the corresponding temperature of 71 and 105° C. (160 and 220° F.), to form the first sheet material. The first sheet material was subsequently stretched in the transverse direction at a ratio of 3 times at a temperature of 32, 49 and 121° C. (90, 120 and 250° F.) of the corresponding preheat, stretch and heat-anneal zones. The finished sheet product tested to contain less than 0.1% of residual fluid. The material exhibited a porosity of 69%, resistance of 54 mohm-cm.sq., resistivity of 16 ohm-cm and a wicking rate of 18 seconds.

Examples 4, 5, 7, 8, 9 and 10

Polymer L5906 and MSC fluid were melt blended in an extruder. The percentages of compositions and the first machine and second transverse directional stretches are listed in Tables 1 and 2 for each of the respective examples. These Examples were fabricated to meet the crystallinity and fluid targets of the first material, with crystallinity above 50% and fluid between 10% and 45% respectively. The resulted f/c ratio is below 0.8. The resulted resistivities of the Examples were below 100 ohm-cm.sq.

Example 6

Polymer L5906 at 46% and MSC fluid at 54% from Citgo were melt blended in an extruder. The ratios of the first machine direction stretch and the second transverse direction stretch are listed in Table 2. This Example resulted in resistivity of 264 ohm-cm.sq., which is marginally higher than the more desirable target. This example illustrates that higher resistivity may be produced by the combination of the marginally lower crystallinity (56%) and higher residual fluid (46%) in the first material. The apparent f/c ratio is 0.82.

Comparative Example 11

Polymer L5906 at 49% and MSC fluid at 51% (same components and amounts as Ex. 4) were melt blended in an extruder. The first machine direction stretch and the second transverse direction stretch are listed in Table 3. This machine direction stretch was 1.5 times and transverse direction stretch was 3 times. This sample was formed without drying or heating to influence the crystallinity and fluid percentages of the first material. The resulted crystallinity and fluid was 30% and 51% respectively. The resulted f/c ratio was 1.7. This Example resulted in a very high resistivity of 999 ohm-cm.sq. (maximum value on the resistivity test).

Comparative Example 12

Polymer L5906 at 46% and MSC fluid at 54% were melt blended in an extruder. The first machine direction stretch and the second transverse direction stretch are listed in Table 3. This sample had a machine direction stretch of 4 times and transverse direction stretch of 2.7 times. It was formed without drying or heating to influence the crystallinity and fluid percentages of the first material. The resulted crystallinity and fluid content was 47% and 48% respectively. The resulted f/c ratio was 0.98. The Example resulted in a very high resistivity of 999 ohm-cm.sq.

Comparative Example 13

Polymer L5906 at 49% and MSC fluid at 51% were melt blended in an extruder. The first stretching was conducted in the machine direction by stretching at a ratio of 1.5 and 3.5 sequentially and the second stretching done by transverse direction stretch was 2.5 times, all conditions are listed in Table 3. The resultant first material crystallinity was 82% while the first material was retained at elevated temperature to produce a low fluid content of 12%. The resulted f/c ratio is 0.15. The product sample resulted in an intermittent non-uniform banding appearance produced when certain surface areas are stretched exhibiting an opaque white appearance, but intermittently, there are also areas where no stretch occurred, resulting in a clear transparent film. The non-stretchable area may be due to very high crystallinity and very low fluid percentages, preventing a uniform second stretch. Physical tests of the product showed the opaque stretched porous area has a thickness of 26 microns and a corresponding resistivity of 18 ohm-cm.sq. whereas the non-stretched clear area has a thickness of 65 microns and a resistivity of 999 ohm-cm.sq.

TABLE 1

| Example | #1 | #2 | #3 | #4 |
|---|---|---|---|---|
| Polymer Type | 19A | L5906 | L5906 | L5906 |
| Fluid Type | MSB | MSC | MSC | MSC |
| Extrusion Polymer % | 41% | 36% | 45% | 49% |
| Extrusion Fluid % | 59% | 64% | 55% | 51% |
| Extrusion Rate (kg/hr) | 3.3 | 3 | 4.6 | 5 |
| Extrusion Cast Speed (ft/min) | 4.4 | 1.2 | 3 | 3 |
| Extrusion Cast film thickness (mils) | 6.4 | 21.5 | 12.7 | 13.8 |
| First Stretch | | | | |
| MD Dry Stretch 1 Temp (F.) | 140 | 160 | 160 | 180 |
| MD Dry Stretch 2 Temp (F.) | 160 | 175 | 220 | 215 |
| MD Dry Stretch 3 Temp (F.) | 180 | 190 | none | none |
| MD Dry Stretch 4 Temp (F.) | 200 | 230 | none | none |
| MD Dry Stretch 1 Ratio | 1.5 | 1.5 | 1.5 | 1.5 |
| MD Dry Stretch 2 Ratio | 1.4 | 1.2 | 4 | 3.5 |
| MD Dry Stretch 3 Ratio | 1.4 | 1.2 | none | none |
| MD Dry Stretch 4 Ratio | 1.4 | 4 | none | none |
| MD Total Stretch Ratio | 4.116 | 8.64 | 6 | 5.25 |
| Second Stretch | | | | |
| TD Stretch Zone 1 Temp (F.) | 160 | 90 | 90 | 80 |
| TD Stretch Zone 2 Temp (F.) | 160 | 90 | 120 | none |
| TD Stretch Zone 3 Temp (F.) | 160 | 230 | 250 | 160 |
| TD Stretch Ratio | 3.5 | 2.5 | 3 | 2.5 |
| Combined MD*TD Ratio | 14.406 | 21.6 | 18 | 13.125 |
| First Material, Crystallinity (c %) | — | — | — | 56% |
| First Material, Fluid (f %) | — | — | — | 42% |
| f/c ratio | | | | 0.75 |
| Thickness (microns) | 52 | 24 | 33 | 22 |
| Basis wt (gm/m. sq.) | 11.7 | 16.2 | 12.2 | 11.0 |
| Porosity (%) | 84% | 57% | 69% | 48% |
| Pore size (mean, micron) | | | | |
| Resistance (mohm-cm 2) | 30 | 40 | 54 | 150 |
| Resistivity (ohm-cm) | 6 | 17 | 16 | 68 |
| Tensile MD (kg/cm$^2$) | | 1096 | 1338 | |
| Tensile TD (kg/cm$^2$) | | 266 | 280 | |
| Elongation MD (%) | | 40% | 50 | |
| Elongation TD (%) | | 265% | 350 | |
| Puncture (gmf) | | 440 | 370 | 512 |
| Wicking (sec.) | 55 | 25 | 18 | |
| Appearance: | Uniform OW | Uniform OW | Uniform OW | Uniform OW |

TABLE 2

| | Example | | | | | |
|---|---|---|---|---|---|---|
| | #5 | #6 | #7 | #8 | #9 | #10 |
| Polymer Type | L5906 | L5906 | L5906 | L5906 | L5906 | L5906 |
| Fluid Type | MSC | MSC | MSC | MSC | MSC | MSC |
| Extrusion Polymer % | 46% | 46% | 46% | 46% | 46% | 46% |
| Extrusion Fluid % | 54% | 54% | 54% | 54% | 54% | 54% |
| Extrusion Rate (kg/hr) | 5.3 | 5.3 | 5.3 | 5.3 | 5.3 | 5.3 |
| Extrusion Cast Speed (ft/min) | 2.6 | 2.6 | 2.6 | 2.6 | 2.6 | 2.6 |
| Extrusion Cast film thickness (mils) | 12.7 | 12.7 | 12.7 | 12.7 | 12.7 | 12.7 |
| First Stretch | | | | | | |
| MD Dry Stretch 1 Temp (F.) | 160 | 160 | 160 | 160 | 160 | 160 |
| MD Dry Stretch 2 Temp (F.) | 200 | 200 | 200 | 200 | 200 | 200 |
| MD Dry Stretch 3 Temp (F.) | 230 | 230 | 230 | 230 | 230 | 230 |
| Residence Time (Str#3) | 77 sec. | 31 sec. | 31 sec. | 31 sec. | 21 sec. | 10 sec. |
| MD Dry Stretch 4 Temp (F.) | none | none | none | none | none | none |
| MD Dry Stretch 1 Ratio | 1 | 1 | 1 | 1 | 1 | 1 |
| MD Dry Stretch 2 Ratio | 2.5 | 2.5 | 4 | 6 | 6 | 6 |
| MD Dry Stretch 3 Ratio | 1 | 1 | 1 | 1 | 1 | 1 |
| MD Dry Stretch 4 Ratio | none | none | none | none | none | none |
| MD Total Stretch Ratio | 2.5 | 2.5 | 4 | 6 | 6 | 6 |
| Second Stretch | | | | | | |
| TD Stretch Zone 1 Temp (F.) | 80 | 80 | 80 | 80 | 80 | 80 |
| TD Stretch Zone 2 Temp (F.) | none | none | none | none | none | none |
| TD Stretch Zone 3 Temp (F.) | 160 | 160 | 160 | 160 | 160 | 160 |
| TD Stretch Ratio | 3.1 | 2.4 | 2.7 | 3 | 2.9 | 2.8 |
| Combined MD * TD Ratio | 7.75 | 6 | 10.8 | 18 | 17.4 | 16.8 |
| First Material, Crystallinity (c %) | 64% | 56% | 71% | 76% | 81% | 68% |
| First Material, Fluid (f %) | 18% | 46% | 25% | 11% | 18% | 31% |

TABLE 2-continued

|  | Example | | | | | |
|---|---|---|---|---|---|---|
|  | #5 | #6 | #7 | #8 | #9 | #10 |
| f/c ratio | 0.28 | 0.82 | 0.35 | 0.14 | 0.22 | 0.46 |
| Thickness (microns) | 70 | 115 | 65 | 40 | 28 | 34 |
| Basis wt (gm/m.sq.) | 56.5 | 83.3 | 44.6 | 26.8 | 23.8 | 27.8 |
| Porosity (%) | 35% | 24% | 41% | 44% | 53% | 42% |
| Pore size (mean, micron) |  |  | 0.050 | 0.062 |  |  |
| Resistance (mohm-cm$^2$) | 426 | 3041 | 215 | 65 | 152 | 131 |
| Resistivity (ohm-cm) | 61 | 264 | 33 | 23 | 38 | 39 |
| Puncture (gmf) |  |  | 665 | 570 | 540 | 580 |
| Wicking (sec.) | 7 | >10 min. | 71 | 8 | 5 | 5 |
| Appearance: | Uniform opaque white | Uniformly opaque white | Uniform opaque white | Uniform opaque white | Uniform opaque white | Uniform opaque white |

MD = Machine Direction
TD = Transverse Direction
OW = Opaque-White

TABLE 3

|  | Example | | |
|---|---|---|---|
|  | comparative #11 | comparative #12 | comparative #13 |
| Polymer Type | L5906 | L5906 | L5906 |
| Fluid Type | MSC | MSC | MSC |
| Extrusion Polymer % | 49% | 46% | 49% |
| Extrusion Fluid % | 51% | 54% | 51% |
| Extrusion Rate (kg/hr) | 5 | 5.3 | 5 |
| Extrusion Cast Speed (ft/min) | 3 | 2.6 | 3 |
| Extrusion Cast film thickness (mils) | 13.8 | 12.7 | 13.8 |
| First Stretch |  |  |  |
| MD Dry Stretch 1 Temp (F.) | 180 | 160 | 180 |
| MD Dry Stretch 2 Temp (F.) | none | 200 | 215 |
| MD Dry Stretch 3 Temp (F.) | none | none | none |
| MD Dry Stretch 4 Temp (F.) | none | none | none |
| MD Dry Stretch 1 Ratio | 1.5 | 1 | 1.5 |
| MD Dry Stretch 2 Ratio | none | 4 | 3.5 |
| MD Dry Stretch 3 Ratio | none | none | none |
| MD Dry Stretch 4 Ratio | none | none | none |
| MD Total Stretch Ratio | 1.5 | 4 | 5.25 |
| Second Stretch |  |  |  |
| TD Stretch Zone 1 Temp (F.) | 80 | 80 | 80 |
| TD Stretch Zone 2 Temp (F.) | none | none | none |
| TD Stretch Zone 3 Temp (F.) | 160 | 160 | 160 |
| LTD Stretch Ratio | 3 | 2.7 | 2.5 |
| Combined MD * TD Ratio | 4.5 | 10.8 | 13.125 |
| First Material, Crystallinity (c %) | 30% | 48% | 82% |
| First Material, Fluid (f %) | 51% | 47% | 12% |
| f/c ratio | 1.70 | 0.98 | 0.15 |
| Thickness (microns) | 305 | 37 | 26 to 65 |
| Basis wt (gm/m. sq.) | 262.1 | 46.6 | 41.7 |
| Porosity (%) | 0% | 4% | 25% |
| Pore size (mean, micron) |  | *NDP |  |
| Resistance (mohm-cm 2) |  |  |  |
| Resistivity (ohm-cm) | 999 | 999 | 18 to 999 |
| Puncture (gmf) |  | 715 |  |
| Wicking (sec.) | *nw | *nw |  |
| Appearance: | Uniform translucent | Uniformly clear film | Banding non-uniform TDO stretch |

*NDP = No Detected Pores
*nw = No wicking nor wetout

The invention claimed is:

1. A method of forming a sheet product comprising:
  a) mixing, at a temperature of from 100 to 250° C., a thermoplastic polymer having a degree of crystallinity of at least 30% and a melt flow index (MFI) of less than 0.8 with from about 20 to 80 wt. % of a first fluid having a boiling point of from 135 to 300° C. and a vapor pressure of from 1 to 50 mm Hg at 70° C. to form a substantially uniform mixture;
  b) shaping the substantially uniform mixture into an initial shaped sheet material having length and breadth dimensions and a thickness sufficient to allow stretching to occur, the initial shaped sheet material being of substantially uniform composition across its thickness;

c) contacting the initial shaped sheet material of b) with a second fluid having a temperature up to about 100° C. comprising at least 75 wt % of first fluid and the remainder composed of fluids miscible with said first fluid and having a BP of from 135 to 300° C. and a vapor pressure of from 1 to 50 mm Hg at 70° C. for a time sufficient to cause the sheet material to have a temperature of less than the melt temperature ($T_m$) of the polymer therein;

d) first stretching the sheet material of (c) in at least one first direction at least 225% of the original dimension in said direction while maintaining the sheet at a temperature of from ($T_m$–70) to ($T_m$–20)° C. to produce a substantially non-porous sheet product having polymer crystallinity (c) of at least 40% and simultaneously removing first and second fluid from said sheet material by vaporization to cause residual fluid (f) of the first stretched sheet material to be less than about 45 weight percent of the sheet material c) and have a f/c ratio of at least 0.15;

e) second stretching the sheet material of d) in at least one second direction which is transverse to the first direction and at least 125% of the original dimension of said second direction while maintaining the sheet at a temperature of at least 20° C. below that of d) to produce a porous sheet product having at least 40% crystallinity and simultaneously removing first and second fluid from said sheet material by vaporization to cause residual fluid of the sheet material to be from about 10 up to about 45 weight percent;

f) subjecting the sheet material to a temperature of from ($T_m$–50) to ($T_m$–5) ° C. while under machine or transverse tension for a period of time to cause the sheet material to have fixed stretched dimensions;

g) removing substantially all first and second fluids from the sheet material by vaporization either during step f) or separately or a combination thereof;

h) cooling the sheet material to ambient temperature to form a sheet product.

2. The method of claim 1 wherein the thermoplastic polymer has a weight average molecular weight of from $2\times10^4$ to $1\times10^8$; has crystallinity of from 40 to 85% of mass and is selected from polyethylene, polypropylene or copolymers thereof and mixtures thereof.

3. The method of claim 1 or 2 wherein the first fluid has a vapor pressure of 0.1 to 5 mm Hg at 20° C. and a flash point of from 30 to 170° C. and is present in the uniform mixture a) in from 40 to 70 weight percent.

4. The method of claim 2 wherein said second fluid and first fluid are the same.

5. The method of claim 3 wherein said second fluid and first fluid are the same.

6. The method of claim 2 wherein the shaped sheet material is first stretched under step d) to produce a sheet material having from 40 to 85% crystallinity; is first stretched in the machine direction, is second stretched in a direction transverse to the first stretch direction, and the first stretched sheet material has up to 45% by weight fluid and has a fluid to crystallinity ratio of 0.15 to 0.9.

7. The method of claim 3 wherein the shaped sheet material is first stretched under step d) to produce a sheet material having from 40 to 85% crystallinity; is first stretched in the machine direction, is second stretched in a direction transverse to the first stretch direction, and the first stretched sheet material has up to 45% by weight fluid and has a fluid to crystallinity ratio of 0.15 to 0.9.

8. The method of claim 6 wherein the first stretched sheet material is second stretched under step e) simultaneously in both transverse and machine direction at temperature of from ambient to 95° C. and the second stretched sheet material of e) has from 10 to 40 weight % fluid remaining therein.

9. The method of claim 7 wherein the first stretched sheet material is second stretched under step e) simultaneously in both transverse and machine direction at temperature of from ambient to 95° C. and the second stretched sheet material of e) has from 10 to 40 weight % fluid remaining therein.

10. The method of claim 2 wherein the polymer is selected from a high density polyethylene having a weight average molecular weight of from $1\times10^5$ to $5\times10^5$ and a polymer crystallinity of from 40 to 85 percent; the first fluid forming the mixture a) is present in from 40 to 70 weight percent; the initially shaped material is first contacted with a gas at temperature of from 0 to 100° C.; the first and second fluids are the same; the first sheet material has a fluid to polymer crystallinity ratio of from 0.2 to 0.7; and the resultant sheet product has up to about 5 weight percent first and second fluid therein.

11. A method of forming a sheet product comprising:
a) mixing at a temperature of from 100 to 250° C. a thermoplastic polymer having a degree of crystallinity of at least 40% with at least 20 wt % of a first fluid having a BP of from 135 to 300° C. and a vapor pressure of from 1 to 5 mm Hg at 70° C. to form a substantially uniform mixture;

b) shaping the substantially uniform mixture into an initial sheet material having length and breadth dimensions and a thickness sufficient to allow stretching to occur, the initial sheet material being of substantially uniform composition across its thickness;

c) contacting the shaped sheet material of b) with a second fluid having a temperature of from 0 to 100° C. comprising at least 75 wt % of first fluid and the remainder composed of fluids miscible with said first fluid for a time sufficient to cause the polymer and first fluid of the sheet material to form separate phases therein;

d) stretching the sheet material of (c) in one direction at least 225% of the original dimension in said direction while maintaining the sheet at ($T_{m-}70$) to ($T_{m-}20$)° C. to produce a substantially non-porous sheet product having at least 40% crystallinity while retaining at least about 15 wt % of first fluid as part of sheet material;

e) stretching the sheet material in a second direction which is transverse to the first stretch direction at least 125% of the original dimension in said direction while maintaining the sheet at ambient to 20° C. below that of d)to produce a porous sheet product having at least 40% crystallinity while retaining at least about 10 wt % of first fluid as part of sheet material;

f) subjecting the sheet material to a temperature of from ($T_{m-}50$) to ($T_{m-}5$)° C. for a period of time to cause the sheet material to have fixed stretched dimensions;

g) removing substantially all first fluid and second fluid from the sheet material by evaporation during steps (f) or separately or a combination thereof; and h) cooling the sheet material to ambient temperature to form a sheet product having length and breadth dimensions and a thickness comprising alternating regions running the length and breadth directions composed of first regions having average pore size of from 0.01 to 2 micron and second regions having average pore diameter of at least 0.5 micron and an aspect ratio of at least 3:1.

12. The method according to claim 11 wherein:
in step a) the polymer forming the initial sheet material has crystallinity of from 40 to 85%; the first fluid has a vapor pressure of 0.1 to 3 mm Hg at 20° C. and a flash point of from 30 to 170° C.; and the fluid is in from 20 to 70 wt % of the composition:

in step b) the thickness of the initial sheet material is from 0.2 to 3 mm:

in step c) the contact time of step (c) is from 1 to 90; the temperature of the second fluid is 20 to 90° C.; and the sheet material is cooled below the $T_m$ of the polymer:

in step d) the sheet material is stretched 225 to 1000%; the degree of crystallinity of the polymer forming the first sheet material is up to 80%; and the first sheet material has from 15 to 45% fluid:

in step e) wherein the stretching causes from 125 to 700% elongation; and the first and second stretching provides a combined stretch ratio of at least 2.8:

in step f) the period of time is from 1 to 120 seconds: and in step g) the removal is done under ambient or reduced pressure; and with collection of the fluid for recycling.

13. The method as claimed in claim 1, wherein the first fluid is mineral spirits, the mineral spirits comprising a mixture of fluids having a boiling range of at least 20° C.

14. The method as claimed in claim 13, wherein the second fluid is mineral spirits, the mineral spirits comprising a mixture of fluids having a boiling range of at least 20° C.

15. The method as claimed in claim 1, wherein the sheet product of step (h) consists of the thermoplastic polymer and up to about 1 percent of the first fluid.

16. The method as claimed in claim 1, wherein step (c) comprises contacting the initial shaped sheet material of b) with a second fluid having a temperature up to about 90° C.

17. The method as claimed in claim 1, wherein the sheet material produced by step (c) exhibits polymer crystallinity of up to about 30 percent by mass.

18. The method as claimed in claim 17, wherein the sheet material produced by step (c) exhibits polymer crystallinity of up to about 20 percent by mass.

19. The method as claimed in claim 1, wherein the sheet material produced in step (d) has a f/c ratio of between 0.15 and 0.9.

20. The method as claimed in claim 1, further comprising the step of collecting at least one of the first fluid and the second fluid removed in at least one of steps (d), (e) and (g) for recycling in subsequent performance of the method.

21. A method of forming a porous sheet product comprising:
  a) mixing a polyolefin having at least 30% crystallinity with from about 20 to 80 wt. % of a first fluid having a boiling point of from 135 to 300° C. and a vapor pressure of from 1 to 50mm Hg at 70° C., the polyolefin being at least partially soluble in the first fluid, to form a substantially uniform mixture;
  b) shaping the substantially uniform mixture into an initial shaped sheet material having exposed outer surfaces, length and breadth dimensions, and a thickness between the exposed outer surfaces sufficient to allow stretching to occur, the initial shaped sheet material being of substantially uniform composition across its thickness;
  c) contacting the initial shaped sheet material of step (b) with a second fluid having a temperature up to about 100° C., the second fluid comprising at least 75 wt % of a fluid identical to the first fluid, for a time sufficient to cause the initial shaped sheet material to have a temperature of less than the melt temperature ($T_m$) of the polyolefin therein;
  d) first stretching the sheet material of step (c) in at least one first direction and simultaneously vaporizing first and second fluid from said sheet material to produce a substantially non-porous sheet product; and
  e) second stretching the substantially non-porous sheet product of step (d) in at least one second direction which is different from the first direction and simultaneously vaporizing first and second fluid from said sheet material to produce a porous sheet product.

22. The method as claimed in claim 21 wherein the first fluid is mineral spirits, the mineral spirits comprising a mixture of fluids having a boiling range of at least 20° C.

23. The method as claimed in claim 22, wherein the porous sheet product of step (e) consists of the polyolefin and up to about 1 percent of the first fluid.

* * * * *